United States Patent [19]

Konno

[11] Patent Number: 4,807,207
[45] Date of Patent: Feb. 21, 1989

[54] TRACKING CONTROL DEVICE

[75] Inventor: Yoshikiyo Konno, Saitama, Japan

[73] Assignee: Pioneer Electronic Corporation, Tokyo, Japan

[21] Appl. No.: 24,214

[22] Filed: Mar. 10, 1987

[30] Foreign Application Priority Data

Mar. 10, 1986 [JP] Japan .............................. 61-34095[U]

[51] Int. Cl.⁴ .............................................. G11B 7/09
[52] U.S. Cl. ...................................... 369/46; 369/46
[58] Field of Search ...................... 369/44, 45, 46, 50, 369/109, 110, 32; 250/201

[56] References Cited

U.S. PATENT DOCUMENTS

| | | | |
|---|---|---|---|
| 3,932,700 | 1/1976 | Snopko | 369/45 |
| 4,271,334 | 6/1981 | Yardy | 369/44 |
| 4,330,880 | 5/1982 | Van Dijk | 369/44 |
| 4,397,010 | 8/1983 | Nabeshima | 369/44 |
| 4,471,477 | 9/1984 | Bierhoff | 369/46 |
| 4,482,989 | 11/1984 | Bierhoff | 369/46 |
| 4,494,154 | 1/1985 | Akiyama | 369/44 |
| 4,531,206 | 7/1985 | Kimura | 369/44 |
| 4,539,665 | 9/1985 | Iso et al. | 369/44 |
| 4,628,497 | 12/1986 | Bierhoff | 369/44 |

FOREIGN PATENT DOCUMENTS

| | | |
|---|---|---|
| 0044194 | 7/1981 | European Pat. Off. . |
| 0090379 | 3/1983 | European Pat. Off. . |
| 2504570 | 2/1975 | Fed. Rep. of Germany . |

Primary Examiner—Donald McElheny, Jr.
Attorney, Agent, or Firm—Sughrue, Mion, Zinn, Macpeak & Seas

[57] ABSTRACT

Tracking control device in which a tracking error signal for controlling the position of a data detecting point with a driving circuit is added to a warbling signal. The warbling signal is separated from an input signal to the drive means by a separating circuit and is utilized to detect and control the gain of the tracking servo loop. The application of the input signal to the separating circuit is interrupted when the data detecting point is located between tracks so that the tracking servo is stable at all times.

7 Claims, 1 Drawing Sheet

TRACKING CONTROL DEVICE

BACKGROUND OF THE INVENTION

1. Field of the Invention

This invention relates to a tracking control device in a video disk player, a digital audio disk player, and so forth.

2. Background of the Invention

A conventional tracking device in a video disk player is shown in FIG. 1. In FIG. 1, a pair of detecting elements 1 such as photo-detectors (in the case of an optical disk player) are arranged on both sides of a track. The outputs of the detecting elements 1 are applied respectively through gain control circuits (AGC) 2 and 3 to a differential amplifier 4, which outputs a tracking error signal. The tracking error signal is applied through an addition circuit 5, an equalizer 6 and a drive circuit 7 to an actuator 8. The actuator 8 is adapted to drive an objective lens 8b through solenoid action thereby to cause a data detecting point to follow the track.

In the addition circuit 5, a warbling signal having a predetermined frequency which is outputted by an oscillating circuit 9 and phase-shifted by a phase-shifting circuit 10 as required is added to the tracking error signal, so that the data detecting point is warbled over a range, for instance, 0.05 to 0.1 μm with respect to the track. A band-pass filter (BPF) 11 receives the output of the equalizer 6 and separates the warbling signal in the tracking servo loop from the output. The warbling signal thus separated, after being shaped by a comparisoncircuit 12, is applied to one input terminal of an exclusive-OR circuit 13, to the other terminal of which the warbling signal outputted by theoscillating circuit 9 is applied after being shaped by a comparison circuit 14. The two comparison circuits 12 and 14 compare their inputs against internal reference voltages and output binary signals dependent on whether the inputs are above or below the reference voltages. Possible values of the reference voltages are zero. The exclusive-OR circuit 13 subjects the warbling signal in the tracking servo loop to synchronous detection to detect and output a signal corresponding to the gain of the tracking servo loop. The detection output of the exclosure-OR circuit 13 is smoothed by a low-pass filter (LPF) 15, the output of which is applied to the gain control circuits 2 and 2 described above, so that the gain of the tracking servo loop (or the output levels of the detecting elements 1) is automatically controlled.

In the case where a special reproduction such as a still picture reproduction is carried out by causing the data detecting point to jump tracks, the data detecting point is moved from a track to the position between the tracks and from the position to the track. When the data detecting signal is warbled between the tracks, the polarity of the warbling signal is opposite to that of the warbling signal provided when it is warbled near the track. Therefore, in this case, a correct synchronous detection output cannot be obtained. However, in the conventional tracking control device, the gain control circuits 2 and 3 are operated as they are even when the data detecting point is positioned between the tracks. Therefore, the conventional tracking control device suffers from a difficulty that a correct gain control servo and accordingly a stable tracking servo cannot be obtained.

SUMMARY OF THE INVENTION

Accordingly, an object of this invention is to eliminate the above-described difficulty accompanying a conventional tracking control device in a video disk player, a digital audio disk player, and so forth.

The foregoing object and other objects of the invention have been achieved by the provision of a tracking control device which, according to the invention, includes at least one pair of detecting elements arranged on both sides of a track. A differential amplifier receives outputs of the detecting elements to provide a tracking error signal. An oscillating circuit outputs a warbling signal having a predetermined frequency. An addition circuit adds the warbling signal to the tracking error signal. Drive means drive a data detecting point according to the output signal of the addition circuit. A separating circuit separates the warbling signal from the signal applied to the drive means. A gain detecting circuit detects the gain of the tracking servo loop from the output of the separating circuit. Gain control circuits control the gain of the tracking servo loop according to the detection output of the gain detecting circuit. A position detecting circuit detects when the data detecting point is located between tracks. An interrupting circuit interrupts the application of the input signal to the separating circuit according to the detection signal of the position detecting circuit.

In the tracking control device thus organized, the differential amplifier produces a tracking error signal by utilizing the output of the pair of detecting elements, and the tracking error signal thus produced is applied to the drive means to control the position of the data detecting point with respect to the track. The tracking error signal is added to the warbling signal produced by the oscillating circuit. The warbling signal is separated from the signal applied to the drive means, so that the tracking servo loop's gain is detected from the warbling signal and controlled by the detection signal. However, when the data detecting point is located between the tracks, the application of the input signal to the separating circuit is interrupted.

The nature, principle and utility of the invention will become more apparent from the following detailed description when read in conjunction with the accompanying drawings.

DETAILED DESCRIPTION OF THE PREFERRED EMBODIMENTS

Figure 1:
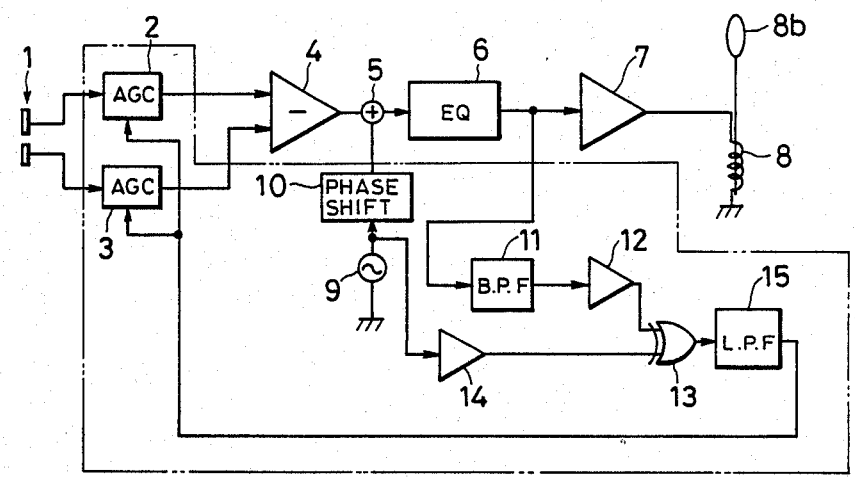
FIG. 1 is a block diagram showing a conventional tracking control device.
Figure 2:
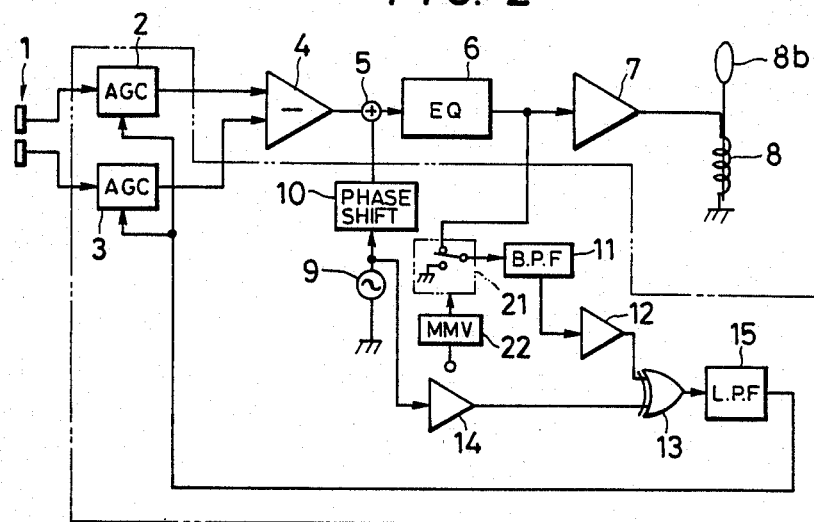
FIG. 2 is a block diagram showing a tracking control device according to this invention.

One example of a tracking control device according to this invention is shown in FIG. 2, in whichthose circuit elements which have beendescribed with reference to FIG. 1 are therefore designated by the same reference numerals or characters.

In the tracking control device of the invention, the output of the equalizer 6 is applied through an interrupting circuit 21 to the band-pass filter 11. The interrupting circuit 21 is controlled, as a position detecting circuit,by a monostable multivibrator 22. The remainder of the arrangement is the same as that in FIG. 1.

The output signals of the detecting elements 1 are applied through the gain control circuits 2 and 3 to the differential amplifier 4, which provides a tracking error signal. The tracking error signal is applied through the addition circuit 5, the equalizer 6 and the drive circuit 7 to the actuator 8. The warbling signal outputted by the oscillating circuit 9 is applied through the phase-shifting circuit 10 to the addition circuit 5, where it is added to the tracking error signal. These operations are completely the same as those in the above-described conventional tracking control device. Therefore, the tracking control is effected with the data detecting point being warbled by the actuator 8.

When the data detecting point is positioned on (or near) a track, the armature of a switch in the interrupting circuit 21 is tripped over to the contact connected to the equalizer 6, as shown in FIG. 2. Accordingly, in this case, the tracking control device operates in the same manner as the above-described conventional tracking control device. That is, the phase of the warbling signal in the tracking servo loop changes with the level of the tracking error signal. Therefore, the exclusive-OR circuit 13 operating as a gain detecting circuit, in synchronization with the warbling signal outputted by the oscillating circuit 9, detects the phase of the warbling signal outputted by the band-pass filter 11 which operates as a separating circuit. The detection output of the exclusive-OR circuit 13, after being smoothed, is applie to the gain control circuits 2 and 3 to control the output signal levels of the detecting elements 1 and, accordingly, the gain of the tracking servo loop.

When a data-detecting-point track-jumping instruction is provided by control means (not shown), the instruction is applied to the monostable multivibrator 22. The monostable multivibrator 22 is adapted to output a pulse whose duration (time width, for instance 350 μs) corresponds to the period of time for which the data detecting point is positioned between tracks. As long as the pulse is outputted, the input terminal of the band-pass filter 11 is grounded by the interrupting circuit 21. That is, the application of the output signal of the equalizer 6 to the band-pass filter 11 is interrupted. For this period of time, the band-pass filter 11, because of its frequency characteristics, resonates with the warbling signal provided before the pulse was inputted (before the jumping). Therefore the frequency and phase of its output are substantially equal to those provided before the jumpint. Accordingly, the output of the exclusive-OR circuit 13 is maintained substantially equal to that provided before the jumping. Therefore, the gains of the gain control circuits 2 and 3 are maintained substantially unchanged.

When the application of the pulse is ended (i.e., the jumping is accomplished), and the armature of the sitch in the interrupting circuit 21 is tripped to connect the input of the band-pass filter 11 to the output of the equalizer 6, the output of the band-pass filter is continuous even if a new warbling signal is applied to the band-pass filter because the gain of the tracking servo loop is not greatly changed from the value provided at the time of application of the pulse.

Figure 3:
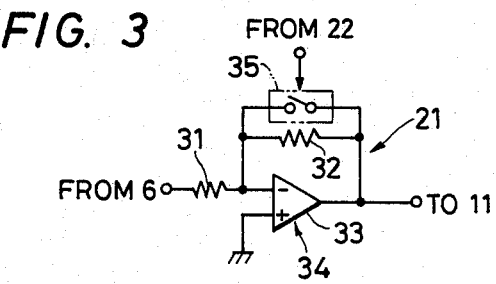
FIG. 3 is a circuit diagram, partly as a block diagram, showing an another example of an interrupting circuit in the device of FIG. 2.

FIG. 3 shows another example of the interrupting circuit 21. In the interrupting circuit 21 of FIG. 3, an operational amplifier 33 with an input resistor 31 and a feedback resistor 32 forms an inverting amplifier 34. The feedback resistor 32 of the inverting amplifier is shunted by a switch 35. The switch 35 is closed by the output pulse of the monostable multivibrator 22, so that the interrupting circuit 21 is placed in a so-called "imaginary short state". Thus, the interrupting circuit 21 of FIG. 3 can provide the same effect as that of FIG. 2.

In the above-described embodiment, the position detecting circuit is provided with the pulse width of the output pulse of the monostable multivibrator 22 set to the period of time for which the data detecting point is positioned between tracks. However, the position detecting circuit may be designed in such a manner that the position of the data detecting point with respect to a track is specifically detected.

As is apparent from the above description, the tracking control device according to the invention comprises: at least one pair of detecting elements arranged on both sides of a track; the differential ampliier for receiving the outputs of the detecting elements to provide a tracking erros signal; the oscillating circuit for outputting a warbling signal having a predetermined frequency; the addition circuit for adding the warbling signal to the tracking error signal; the drive means for driving the data detecting point according to the output signal of the addition circuit; the separating circuit for separating the warbling signal from the signal applied to the drive means; the gain detecting circuit for detecting the gain of the tracking servo loop from the output of the separating circuit; gain control circuits for controlling the gain of the tracking servo loop according to the detection output of the gain detecting circuit; a position detecting cicuit for detecting when the data detecting point is between tracks; and the interrupting circuit for interrupting the application of the input signal to the separating circuit according to the detection output of the position detecting circuit. Therefore, in the tracking control device of the invention, the gain of the tracking servo loop can be stably controlled even in the special reproduction in which the jumping of the data detecting point is required. That is, the tracking control is carried out with high accuracy.

What is claimed is:

1. A tracking control device, comprising:
   at least one pair of detecting elements arranged to be disposed on respective sides of a data detecting point of one of a plurality of tracks of a recording medium during a tracking control operation;
   a differential amplifier for receiving outputs of said detecting elements to provide a tracking error signal;
   an oscillating circuit for outputting a warbling signal having a predetermined frequency;
   an addition circuit for adding said warbling signal to said tracking error signal;
   drive means for causing said data detecting point to follow said one of said tracks according to an output signal of said addition circuit;
   a separating circuit, receiving said output signal, for separating said warbling signal from said output signal applied to said drive means from said addition circuit;
   a gain detecting circuit for detecting a gain of a tracking servo loop, including said detecting elements and said drive means, from an output of said separating circuit corresponding to said warbling signal;
   at least one gain control circuit for controlling the gain of said tracking servo loop according to a detection output of said gain detecting circuit;

a position detecting circuit for detecting when said data detecting point is between tracks; and interrupting means for interrupting application of said detection output to said gain control circuit when a detection signal of said position detecting circuit signifies that said data detection point is between tracks.

2. A tracking control device as recited in claim 1, wherein said position detecting circuit receives a track jumping instruction and in response thereto outputs said detection signal for a predetermined time.

3. A tracking control device as recited in claim 2, wherein said separating device includes a bandpass filter which resonates near said predetermined frequency during an operation of said interrupting circuit.

4. A tracking control device as recited in claim 1, wherein said interrupting means comprises an interrupting circuit which interrupts the application of said output signal to said separating circuit.

5. A method of controlling tracking, comprising the steps of:

detecting signals from respective sides of a data detecting point of one of a plurality of tracks of a recording medium during a tracking control operation;

obtaining a difference between said detected signals to produce a tracking error signal;

producing a warbling signal having a predetermined frequency;

adding said warbling signal to said tracking error signal;

moving said data detecting point according to a result of said adding step;

separating said warbling signal from said adding step result;

detecting a gain of a tracking servo loop from the separated warbling signal;

detecting when a track jumping operation is to be performed; and inhibiting said separating step in accordance with said track jumping operation detecting step.

6. A tracking control device as recited in claim 3, wherein said gain control circuit includes:

a first comparator connected to an output of said band-pass filter;

a second comparator connected to an output of said oscillator;

an exclusive OR circuit receiving outputs of said first and second comparators and providing an output accordingly;

a low-pass filter receiving said output of said exclusive OR circuit; and at least one automatic gain control circuit receiving an output of said low-pass filter and providing a gain output accordingly.

7. A tracking control device as recited in claim 4, wherein said interrupting circuit comprises a monostable multivibrator and a switch receiving an output of said monostable multivibrator to switch between an output of said monostable multivibrator to switch between an output of said addition circuit and a reference terminal in response to said detection signal.

* * * * *